(12) United States Patent  
Song et al.

(10) Patent No.: US 9,264,531 B2
(45) Date of Patent: Feb. 16, 2016

(54) PROVIDING A VISUAL INTERFACE BASED ON A DIALED NUMBER

(71) Applicants: Verizon Patent and Licensing Inc., Arlington, VA (US); Cellco Partnership, Arlington, VA (US)

(72) Inventors: Lin Song, Newton, MA (US); William Andrew Fish, Bedminster, NJ (US); Tim D. Paiement, Colorado Springs, CO (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 14/185,812

(22) Filed: Feb. 20, 2014

(65) Prior Publication Data

US 2015/0237196 A1    Aug. 20, 2015

(51) Int. Cl.
*H04M 3/42* (2006.01)
*H04M 1/725* (2006.01)
*H04W 4/16* (2009.01)

(52) U.S. Cl.
CPC ............ *H04M 1/72583* (2013.01); *H04W 4/16* (2013.01)

(58) Field of Classification Search
CPC ....... H04W 88/02; H04W 4/12; H04W 3/537; H04W 4/02; H04W 8/18; H04W 88/184; H04W 4/14; H04W 1/72583; H04W 3/493; H04W 3/42042; H04W 3/5307
USPC ........ 455/412.2, 414.2, 416, 415, 420, 550.1, 455/466, 566; 379/88.23, 88.13, 88.18
See application file for complete search history.

(56) References Cited

U.S. PATENT DOCUMENTS

| | | | | |
|---|---|---|---|---|
| 8,345,835 | B1 * | 1/2013 | Or-Bach et al. | 379/88.23 |
| 8,861,689 | B1 * | 10/2014 | Typrin | 379/88.22 |
| 2002/0031207 | A1 * | 3/2002 | Lin | 379/88.17 |
| 2010/0141439 | A1 * | 6/2010 | Lunner | 340/540 |

* cited by examiner

*Primary Examiner* — Babar Sarwar

(57) ABSTRACT

A system, or device, may be configured to receive a request to place a voice call; forgo placing the requested voice call; and present a visual interface, associated with an intended callee of the requested voice call, in lieu of placing the requested voice call. The system or device may determine to place the voice call to the original number, or to a different number, based on an input, which is based on the visual interface, from a user who may have, or may not have, made the request.

20 Claims, 13 Drawing Sheets

| Telephone no. | Visual interface URL |
|---|---|
| 800-555-5555 | http://www.foo.com/VI.html |
| 800-000-0000 | http://www.bar.com/interface.htm |
| 888-888-8888 | http://www.foobar.com/menu.htm |

800 →

| URL | Option name | IVR menu state |
|---|---|---|
| http://www.foo.com/option1.html | View events | 1 |
| http://www.foo.com/option2.html?event_id=1 | Justen Timberlake @ V Center Feb. 1 | 1, "Justen Timberlake" |
| http://www.foo.com/option2.html?event_id=2 | J. Zee @ V Center Feb. 2-4 | 1, "J. Zee" |

[800-555-5555 dialed by {User ID}]
["View Events" option selected]
["Justen Timberlake @ V Center Feb. 1" option selected]
["Speak to Agent" option selected]

FIG. 9

PROVIDING A VISUAL INTERFACE BASED ON A DIALED NUMBER

BACKGROUND

Companies often use interactive voice response ("IVR") systems to route telephone calls from customers to representatives that are relevant to customers' needs. IVR systems may make use of automated messages played back to users to represent menus and menu options, and may allow users to navigate the menus by providing vocal feedback and/or by pressing keys on a number pad.

BRIEF DESCRIPTION OF THE DRAWINGS

FIG. 6 illustrates example functional components of a user device;

FIGS. 7 and 8 illustrate example data structures that may be stored by a visual interaction ("VI") server and an IVR server, respectively;

FIG. 9 conceptually illustrates an event log that may be stored by a VI server;

DETAILED DESCRIPTION OF PREFERRED EMBODIMENTS

The following detailed description refers to the accompanying drawings. The same reference numbers in different drawings may identify the same or similar elements.

Companies often use call centers to handle calls from customers. Such calls may correspond to requests to purchase goods or services, obtain customer service, or the like. As smart phone become more and more common, the proportion of calls to companies' call centers from smart phones, compared to landline phones, increases. Calls from smart phones are typically handled the same way as calls from landline phones, even though smart phones often have the capability for richer, more efficient user interaction than landline phones. For example, smart phones generally have the capability of visually displaying information.

Some implementations, described herein, allow for the presentation of visual interfaces in response to certain telephone calls, such as call directed to a call center of a company. These visual interfaces may allow for an enhanced user experience, as a user may be able to more quickly achieve the user's goals (e.g., obtain information, purchase goods or services, etc.) using a visual interface than would be possible through a purely voice-based system. Further, a company that offers the visual interface may save resources (e.g., telephony resources, human resources, etc.) that would be expended by a purely voice-based system.

Figure 1:
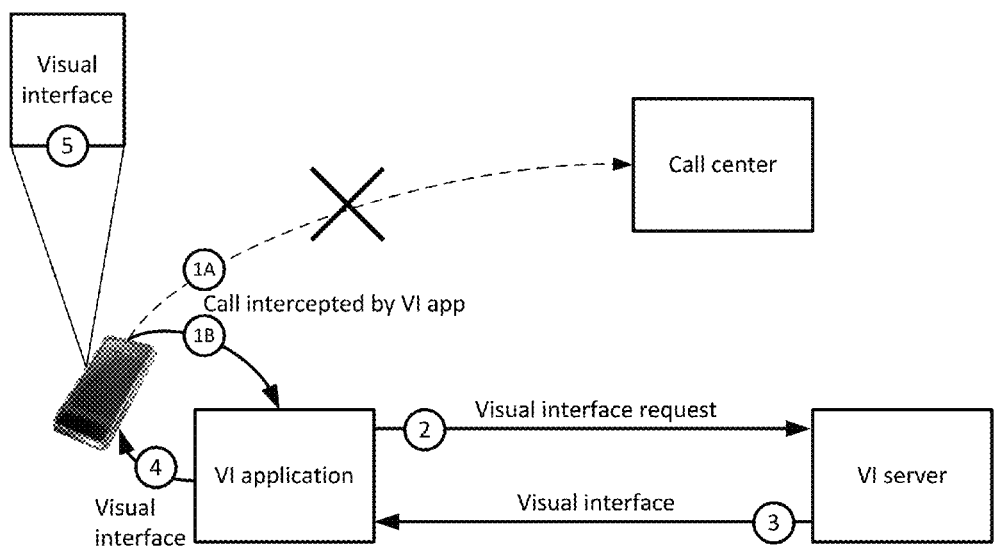
FIGS. 1-4 illustrate overviews of one or more example implementations described herein.

FIGS. 1-4 illustrate an example overview of some implementations. As shown in FIG. 1, a user device (e.g., a smart phone) may attempt to place (at arrow "1A") a call to a call center. For instance, a user of the user device may input a telephone number that corresponds to the call center. A visual interaction ("VI") application, running on the user device, may intercept (at arrow "1B," and as denoted by the "X" through arrow "1A") the call. In other words, the VI application may cause the call not to be placed to the call center. Instead, the VI application may handle the call, as described below.

For example, the VI application may request (at arrow "2") a visual interface from a VI server. The VI server may provide (at arrow "3") a visual interface (and/or a link to the visual interface) that corresponds to the dialed number. The VI application may output (at arrow "4") a VI notification, which may cause the user device to alert the user that a visual interface has been provided. For example, the alert may include an audio alert, requesting that the user interface direct his or her attention to a display screen of the user device. As further shown, the visual interface may be presented (at "5"), via the display screen of the user device.

Figure 2:
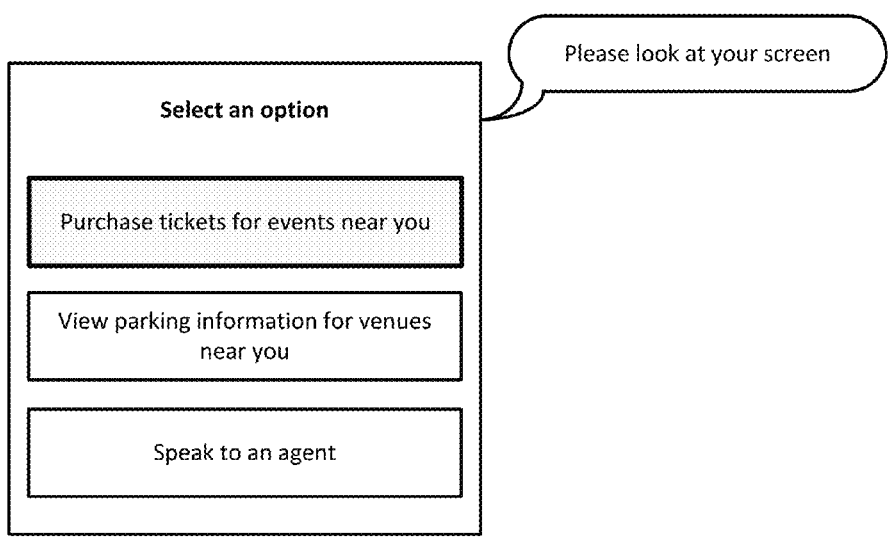

FIG. 2 illustrates an example visual interface that may be provided, as well as an audio alert that may be played ("Please look at your screen"). As shown, the visual interface may include a set of selectable options (e.g., soft buttons), which may include options corresponding to possible reasons the user may have dialed the call center. For example, assume that the call center is associated with a company that sells tickets to events. The visual interface, as shown, may include options pertaining to tickets, such as "Purchase tickets for events near you" and "View parking information for venues near you." As shown, the visual interface may also include an option to speak to an agent. In some implementations, the visual interface may be personalized based on the user. For example, the "near you" aspect of the selectable options may be based on a geographical location of the user device, and/or based on a location indicated in a user profile associated with the user.

Figure 3:

As indicated by the bold and shading in the figure, assume that the user has selected the "Purchase tickets for events near you" option. FIG. 3 illustrates an example visual interface that may be provided based on the selection of the "Purchase tickets for events near you" option. As shown, the visual interface may provide options to purchase tickets for upcoming events at venues that are near the user's location, as well as an option to speak to an agent. As shown, assume that the user has selected the "Speak to an agent" option.

Figure 4:
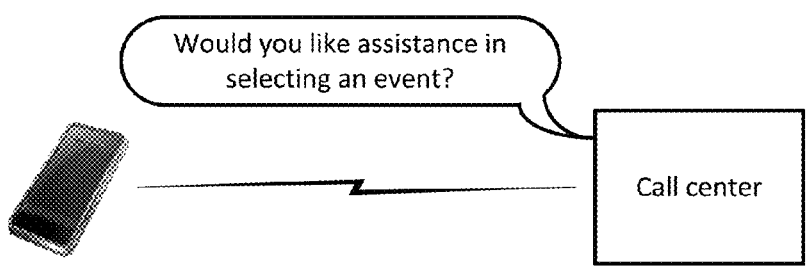

As shown in FIG. 4, and based on the selection of this option, the VI application may call a call center (e.g., the call center initially dialed in FIG. 1, and/or a different call center). As described below, this call may be placed based on the selections made by the user in the visual interface. For example, a telephone number may be placed directly to an agent who assists users in selecting an event for which to purchase tickets. This telephone number may be different than the telephone number initially dialed (in FIG. 1). Additionally, or alternatively, the dialed call center may receive information regarding selections made by the user, so that an agent at the call center may be able to provide assistance to the user without requiring the user to provide information regarding the user's desires that the user has already provided.

Figure 5:
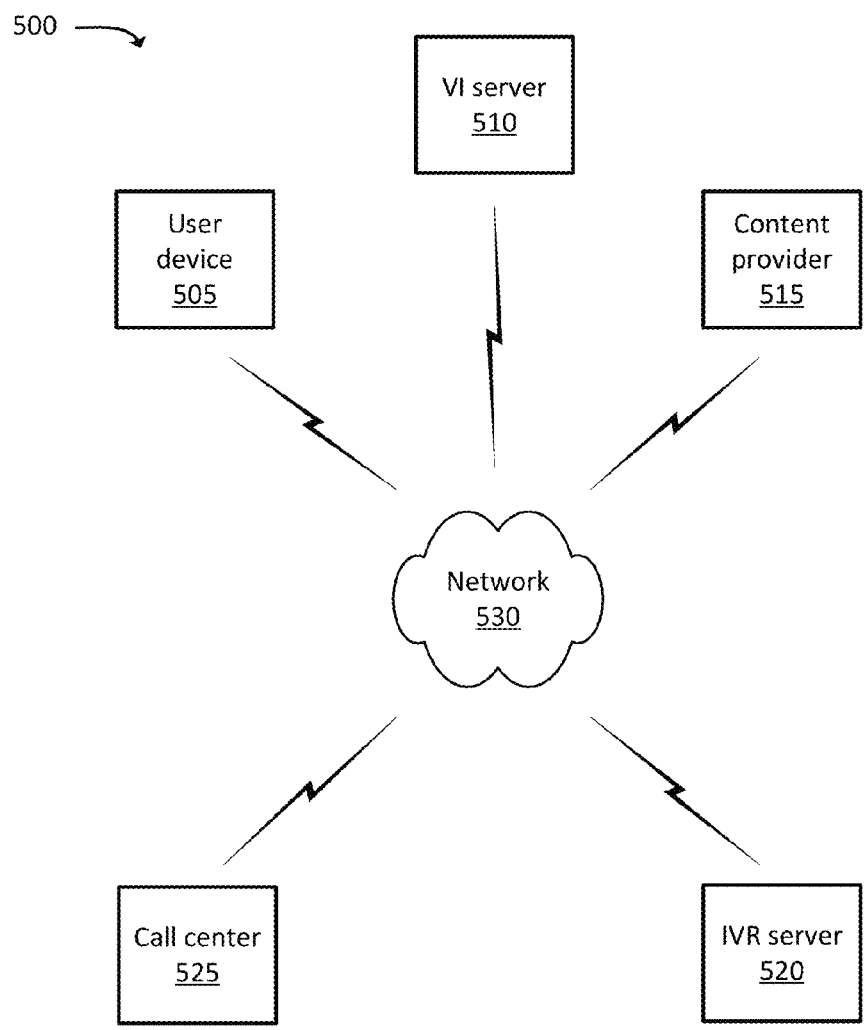
FIG. 5 illustrates an example environment in which systems and/or methods, described herein, may be implemented.

FIG. 5 illustrates an example environment 500, in which systems and/or methods described herein may be implemented. As shown in FIG. 5, environment 500 may include user device 505, VI server 510, content provider 515, IVR server 520, call center 525, and network 530.

The quantity of devices and/or networks, illustrated in FIG. 5, is provided for explanatory purposes only. In practice, environment 500 may include additional devices and/or networks; fewer devices and/or networks; different devices and/or networks; or differently arranged devices and/or networks than illustrated in FIG. 5. Alternatively, or additionally, one or more of the devices of environment 500 may perform one or more functions described as being performed by another one or more of the devices of environments 500. Devices of environment 500 may interconnect with each other and/or other devices via wired connections, wireless connections, or a combination of wired and wireless connections.

Figures 6, 7:
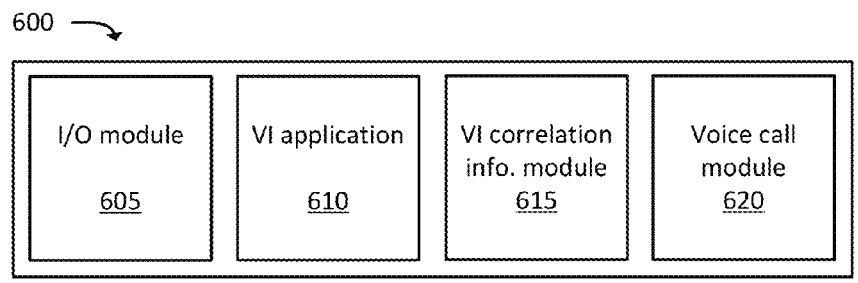

User device 505 may include any computation and communication device, such as a wireless mobile communication device that is capable of communicating with one or more networks (e.g., network 530). For example, user device 505 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a set-top device ("STD"), a personal gaming system, a wearable device, and/or another type of mobile computation and communication device. FIG. 6, described below, illustrates an example of user device 505, according to some implementations.

VI server 510 may include a server device, or a collection of server devices, that maintains information that correlates contact information (e.g., telephone numbers) to visual interfaces. For example, as described below with respect to FIG. 7, VI server 510 may store information that correlates telephone numbers to links (e.g., Uniform Resource Locators ("URLs")) associated with corresponding visual interfaces. VI server 510 may receive an indication (e.g., from a user device) that a particular call center has been dialed, and may provide a URL for a corresponding visual interface. As described below, the URL may correspond to content served by, for example, content provider 515. In some implementations, VI server 510 may deliver content (e.g., visual interface content) in lieu of providing a link to the content.

Content provider 515 may include a server device, or a collection of server devices, that store and/or provide content, such as web content, to user device 505. Content provider 515 may, for instance, include a web server that provides stored content in response to requests for the content. The requests may, for example, include Hypertext Transfer Protocol ("HTTP") requests. For instance, these requests may be based on URLs provided to user device 505 by VI server 510. Content provider 515 may, in some implementations, output requested content using HTTP, Short Message Service ("SMS"), Multimedia Messaging Service ("MMS"), and/or another protocol or technique. The content, provided by content provider 515, may correspond to, for example, visual interfaces in accordance with implementations described herein. In some implementations, VI server 510 and content provider 515 may be implemented together as a single device or a single collection of devices.

IVR server 520 may include a server device, or a collection of server devices, that identifies options, in an IVR menu, that correspond to user input (e.g., as received via a visual interface provided by that content provider 515). For instance, as described below with respect to FIG. 8, IVR server 520 may store information regarding options in an IVR menu, such as an IVR menu associated with a call center. IVR server 520 may use this information to identify IVR menu options that correspond to user input, in order to effectively allow the user to select IVR menu options without necessarily having to listen to audio playback that indicates the IVR menu options. IVR server 520 may also place calls according to the IVR menu options. These calls may be, for example, calls to telephone numbers associated with the menu options, which may be different from a telephone number initially placed to a call center associated with the IVR menu. For instance, while the initially-placed telephone number may be a number associated with a customer service department of the company, the call placed by IVR server 520, based on the selection of a particular IVR menu options, may be placed to a particular department of the customer service department of the company. In some implementations, IVR server 520 may provide content to user device 505. For example, IVR server 520 may provide content for user device 505 to display while user device 505 is "on hold" during a call.

Call center 525 may include a set of devices that receive calls (e.g., customer service calls) from user device 505 and/or from IVR server 520. Call center 525 may be attended to by one or more agents (e.g., operators) that receive the calls and assist users who call center 525. call center 525 may include, for example, telephone devices (e.g., landline telephone devices, Voice over Internet Protocol ("VoIP") devices, etc.), workstations (e.g., desktop computers, laptop computers, etc.), server devices, and/or other types of devices.

Network 530 may include one or more networks, via which user device 505, VI server 510, content provider 515, IVR server 520, and/or call center 525 may communicate. For example, network 530 may include an evolved packet system ("EPS") that includes a Long Term Evolution ("LTE") network and/or an evolved packet core ("EPC") network that operate based on a third generation partnership project ("3GPP") wireless communication standard. The LTE network may be, or may include, a radio access network ("RAN") that includes one or more base stations, some or all of which may take the form of an eNodeB ("eNB"), via which user device 505 and/or another device may communicate with the EPC network. The EPC network may include one or more serving gateways ("SGWs"), mobility management entities ("MMEs"), and/or packet data network ("PDN") gateways ("PGWs"), and may enable user device 505 to communicate with a PDN (e.g., the Internet) and/or an IP Multimedia Subsystem ("IMS") core network. The IMS core network may manage authentication, session initiation, account information, a user profile, etc. associated with user device 505.

Network 530 may additionally, or alternatively, include the Public Switched Telephone Network ("PSTN"), a wide area network ("WAN"), a metropolitan area network ("MAN"), the Internet, a fiber optic-based network, and/or a combination of these or other types of networks. Network 530 may include one or more wireless networks in addition to, or in lieu of, an LTE network. For example, network 530 may include a Code Division Multiple Access ("CDMA") 2000 1× network, a second generation ("2G") wireless network, a third generation ("3G") wireless network, a fourth generation ("4G") wireless network, a fifth generation ("5G") wireless network, a "Wi-Fi" wireless network (e.g., a network that operates according to an Institute of Electrical and Electronics Engineers ("IEEE") 802.11 standard), and/or another wireless network. In some implementations, network 530 may include, and/or be communicatively coupled to, one or more other networks.

FIG. 6 illustrates example functional components of device 600. Device 600 may, in some implementations, correspond to user device 505, shown in FIG. 5. As shown, device 600 may include input/output ("I/O") module 605, VI application 610, VI correlation information module 615, and voice call module 620. In other implementations, device 600 may include additional, fewer, different, or differently arranged components. In some implementations, the functionality described below with regard to one component may be performed in whole or in part by one or more other components.

I/O module 605 may receive user input, such as dialed numbers and/or input received via a visual interface. The user input may correspond to, for example, the actuation of "hard" buttons (e.g. physical buttons on device 600) and/or soft buttons (e.g., buttons presented via a touchscreen of device 600). I/O module 605 may also present visual interfaces via a display screen of device 600, and/or may audibly present notifications and/or other sounds associated with visual interfaces, in accordance with some implementations.

VI application 610 may determine whether a dialed number corresponds to a call center, for which a visual interface is available. For example, VI application 610 may compare a dialed number to information stored by VI correlation information module 615 (described below), and/or may query VI server 510 regarding the dialed number. For example, VI correlation information module 615 and/or VI server 510 may store contact information (e.g., a list of telephone numbers) that correspond to call centers with which a visual interface is associated.

VI application 610 may intercept calls (e.g., corresponding to numbers dialed via I/O module 605) that correspond to call centers with which a visual interface is stored. For example, in lieu of allowing the call to go through to a particular call center (e.g., in lieu of allowing a call to be placed via voice call module 620), VI application 610 may retrieve a visual interface (and/or a link to a visual interface), associated with the call center, from VI server 510 and/or content provider 515, and may cause the visual interface to be presented via I/O module 605.

In some implementations, VI application 610 may place calls, via voice call module 620. The calls, placed by VI application 610, may correspond to user input received via a particular visual interface. For example, VI application 610 may store an event log (e.g., as described below with respect to FIG. 9) that corresponds to user input received via the user interface, and may place a call (e.g., to IVR server 520 and/or to call center 525) according to the user input. For example, VI application 610 may output some, or all, of the event log to IVR server 520, and/or may make selections, associated with an IVR menu, based on the information stored in the event log.

In some implementations, VI application 610 may receive "on hold" content to present, while device 600 is presently engaged on a telephone call with a particular call center 525. For example, VI application 610 may receive the "on hold" content from IVR server 520, based on event log information provided by VI application 610. As described below (e.g., with respect to FIG. 13), the "on hold" content may include content that may be relevant to the user's selections, such as merchandise or information associated with the user's selections, "on hold" music associated with the user's selections, etc.

VI correlation information module 615 may, as described above, store contact information that corresponds to visual interfaces, in accordance with some implementations. For example, as mentioned above, VI correlation information module 615 may store a list of telephone numbers that are associated with particular call centers 525. The information, stored by VI correlation information module 615, may be provided by administrators associated with content provider 515, IVR server 520, and/or call centers 525. Additionally, or alternatively, the information, stored by VI correlation information module 615, may be provided by a telecommunications service provider associated with device 600. In some implementations, device 600 may not include VI correlation information module 615. In some such implementations, VI application 610 may, as mentioned above, query VI server 510 regarding dialed numbers, in order to determine whether the dialed numbers correspond to call centers for which visual interfaces are available.

Voice call module 620 may, as described above, be used to place calls (e.g., voice calls). Voice call module 620 may include, for example, software and/or hardware circuitry that allows device 600 to place calls via a wireless telecommunications network (e.g., a cellular network), the Internet (e.g., using VoIP), the PSTN, etc. For instance, voice call module 620 may receive a set of dialed digits (e.g., from I/O module 605 and/or from VI application 610) that correspond to a telephone number, and may place a call based on the dialed digits.

FIG. 7 illustrates an example data structure 700, which may be stored by VI server 510 and/or VI application 610, in some implementations. As shown, data structure 700 may be used to store information that correlates telephone numbers to visual interfaces (e.g., links to visual interfaces).

For example, a particular example telephone number "800-555-5555" may be associated with a visual interface located at the URL "http://www.foo.com/VI.html." VI server 510 may use this information to provide the visual interface to user device 505. For example, VI server 510 may receive an indication that the telephone number "800-555-5555" was dialed by a user of user device 505. As mentioned above, VI application 610 may have intercepted the call, and requested visual interface information from VI server 510. VI server 510 may provide the URL "http://www.foo.com/VI.html" to user device 505, which may retrieve the visual interface located at the URL. In some implementations, VI server 510 may retrieve the visual interface, and may provide the visual interface to user device 505. The information, stored in data structure 700, may be received from an administrator associated with VI server 510, content provider 515, call center 525, and/or from another source.

While shown as a table, data structure 700 may, in practice, take the form of another data structure, such as a linked list, an array, tree, and/or any other suitable data structure. Further, while specific types of information are shown in FIG. 7, in practice, data structure 700 may include additional, less, different, and/or differently arranged information.

FIG. 8 illustrates an example data structure 800, which may be stored by IVR server 520 in some implementations. As shown, data structure 800 may be used to store information relating to the navigation of IVR menus. For example, the information in data structure 800 may be used to correlate user input, received via user interface, to IVR menu options.

As shown, the information stored by data structure 800 may include information pertaining to the selection of options in a visual interface, such as "URL" and "Option name." The URL field may correspond to a URL of a selected option, in a visual interface. For example, the visual interface may include a HyperText Markup Language ("HTML") page, on which different options correspond to different URLs. Additionally, or alternatively, a particular option may be associated with another identifier, such as a name ("option name"). The "IVR Menu state" field may indicate a set of options, in an IVR menu, that correspond to a particular option associated with a visual interface.

For example, as shown, the URL "http://www.foo.com/option1.html" may correspond to a "View events" option in a visual interface. This option may correspond to a key press of "1," in a particular IVR menu. For instance, an audible representation of the IVR menu may include an audible playback of the phrase, "Press '1' to listen to a list of events." As further shown, the URL "http://www.foo.com/option2.html?event_id=1" may correspond to an option, named "Justen Timberlake @ V Center Feb. 1." Assume that this option is selected after the "View events" option is selected. As shown, the IVR menu state may include "1, 'Justen Timberlake.'" This menu state may simulate, for instance, a user pressing "1" on a keypad of a telephone, and speaking the phrase, "Justen Timberlake." Based on the key press of "1" and the subsequent utterance of the phrase "Justen Timberlake," an option to purchase tickets to a particular Justen Timberlake concert may be presented via an IVR menu.

For instance, a particular telephone number, associated with purchasing tickets (e.g., a telephone number associated with a particular call center 525), may be called by IVR server 520. The dialed call may be connected to user device 505, which may communicate with call center 525. Additionally, or alternatively, IVR server 520 may provide IVR menu state information to user device 505, which may dial a call center and may provide the IVR menu state information automatically (e.g., without further user input), thus bypassing IVR menus that the user would ordinarily be required to navigate manually.

While shown as a table, data structure 800 may, in practice, take the form of another data structure, such as a linked list, an array, tree, and/or any other suitable data structure. Further, while specific types of information are shown in FIG. 8, in practice, data structure 800 may include additional, less, different, and/or differently arranged information. For example, in some implementations, data structure 800 may store information regarding telephone numbers associated with certain options. The telephone numbers may be stored in addition to, or in lieu of, IVR menu state information. For instance, one particular IVR menu state may correspond to one telephone number, while a different IVR menu state may correspond to a different telephone number.

FIG. 9 illustrates an example event log 900 that may be stored by, for example, VI application 610. As mentioned above, event log 900 may store information regarding user input (e.g., as provided by I/O module 605), associated with dialing numbers and/or with visual interfaces. For example, as shown, example event log 900 may indicate that the telephone number "800-555-5555" was dialed by a particular user or user device 505. The event log may also indicate an identifier ("User ID") associated with the user or user device 505, such as a user or device name, a serial number, an International Mobile Station Equipment Identity ("IMEI"), an International Mobile Subscriber Identity ("IMSI") value, an IP address, and/or another identifier. As described below, the identifier may be used to provide personalized service to the user.

Continuing with the example shown in FIG. 9, event log 900 may also include an indication that a "View Events" options was selected, that a "Justen Timberlake @ V Center Feb. 1" option was selected, and that a "Speak to Agent" option was subsequently selected. The information stored in the event log may correspond to information provided as part of a visual interface. For example, a visual interface may include metadata that indicates names that are associated with particular options. For example, this metadata may indicate that a particular selectable option, in the visual interface, is associated with the option name "Justen Timberlake @ V Center Feb. 1." While event log 900 shows option names, in practice, event log 900 may additionally, or alternatively, include URLs, and/or other identifiers, associated with selected options.

As mentioned above, VI application 610 may provide some or all of event log 900 to IVR server 520, in order for IVR server 520 to navigate one or more IVR menus based on user input. For instance, IVR server 520 may identify an IVR menu associated with the telephone number "800-555-555." IVR server 520 may further identify a telephone number associated with the subsequent selections made by the user (i.e., "View Events," then "Justen Timberlake @ V Center Feb. 1," and then "Speak to an Agent"). Additionally, or alternatively, IVR server 520 may dial 800-555-5555 and enter IVR menu options associated with the events in event log 900 (e.g., "1," and then "Justen Timberlake," referring to the example information shown in FIG. 8). Additionally, or alternatively, IVR server 520 may provide information to user device 505, which may allow user device 505 to automatically navigate one or more IVR menus in a manner consistent with the user's interactions with the visual interface. For example, user device 505 may dial 800-555-555 and enter the IVR menu options associated with the user input.

In some implementations, IVR server 520 may use event log information to provide "on hold" content to user device 505. For example, IVR server 520 may provide (e.g., may "push" via SMS and/or another technique) visual interface content that includes options to purchase merchandise or services, indicate interest in merchandise or services, etc. IVR server 520 may additionally, or alternatively, provide audio content, such as music, to be played while user device 505 is on hold. The audio content may be related to the user input. For instance, assuming that the user input relates to a musician, the audio content may include music by the musician, or by a related musician (e.g., a musician of the same or a similar genre).

Figure 10:
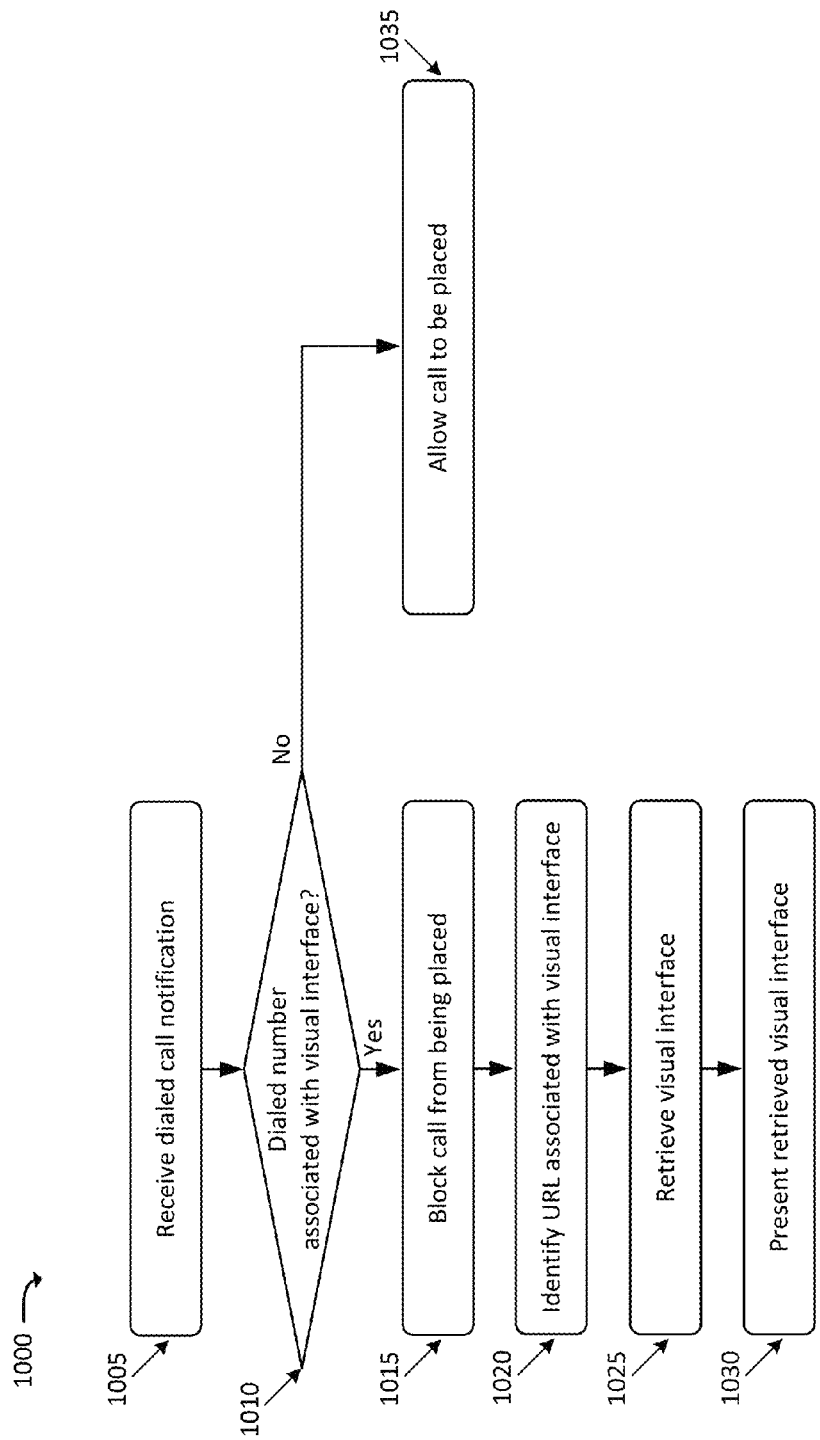
FIG. 10 illustrates an example process for retrieving a visual interface.

FIG. 10 illustrates an example process 1000 for retrieving a visual interface based on a dialed number. In one example implementation, process 1000 may be performed by user device 505 (e.g., by VI application 610). In other implementations, some or all of process 1000 may be performed by one or more other devices in addition to, or in lieu of, user device 505.

Process 1000 may include receiving a dialed call notification (block 1005). For instance, as described above with respect to VI application 610, user device 505 may detect that a number was dialed (e.g., by a user of user device 505). For example, VI application 610 may receive, or intercept, an indication from I/O module 605 regarding the dialed call.

Process 1000 may also include determining whether the dialed number is associated with a visual interface (block 1010). For example, as described above with respect to VI application 610, user device 505 may determine whether the dialed number is associated with a visual interface. For instance, VI application 610 may locally store data (e.g., a list of telephone numbers that are associated with a visual interface) and/or may query an external source (e.g., VI server 510) to determine whether the dialed number is associated with a visual interface.

If the dialed number is associated with a visual interface (block 1010—YES), then process 1000 may include blocking the call from being placed (block 1015). For instance, VI application 610 may prevent the call from being placed by voice call module 620.

Process 1000 may additionally include identifying a URL associated with a visual interface that corresponds to the dialed number (block 1020). For example, as described above with respect to VI server 510 and data structure 700, user device 505 (e.g., VI application 610) may determine a URL for a visual interface that corresponds to the dialed number by requesting the URL from VI server 510. In some implementations, user device 505 may store information associating the dialed number with the URL. In some such implementations, user device 505 may forgo contacting VI server 510 to determine the URL.

Process 1000 may also include retrieving the visual interface (block 1025). For instance, user device 505 may use the URL to access content, stored by content provider 515, which includes the visual interface. In some implementations, in lieu of obtaining (at block 1020) a URL to the visual interface, user device 505 may receive the visual interface content from VI server 510. In some such implementations, VI server 510 may locally store the visual interface content, and/or may retrieve the visual interface content by using the associated URL.

In some implementations, the visual interface content may include, or may be associated with, audio content. For instance, the audio content may include music to be played while the visual interface is presented, audio feedback for options included in the visual interface, an audio notification indicating that the user should direct his or her attention to the display screen, and/or other audio content. In some implementations, the audio content may include an instruction to play audio content locally stored on user device 505. For instance, the instruction may be an instruction to play a generic "alert" sound on user device 505, and/or an instruction to play a sound file that is associated with presenting visual interfaces.

When retrieving the visual interface, user device 505 may output information that may be used to personalize the visual interface. For example, user device 505 may include geo-location information, user profile information, and/or other information that may be used to personalize the visual interface. For instance, content provider 515 may use the personalization information to provide a visual interface that is more relevant to the user (e.g., based on the user's location, user preferences, user activity, etc.).

Figure 11:
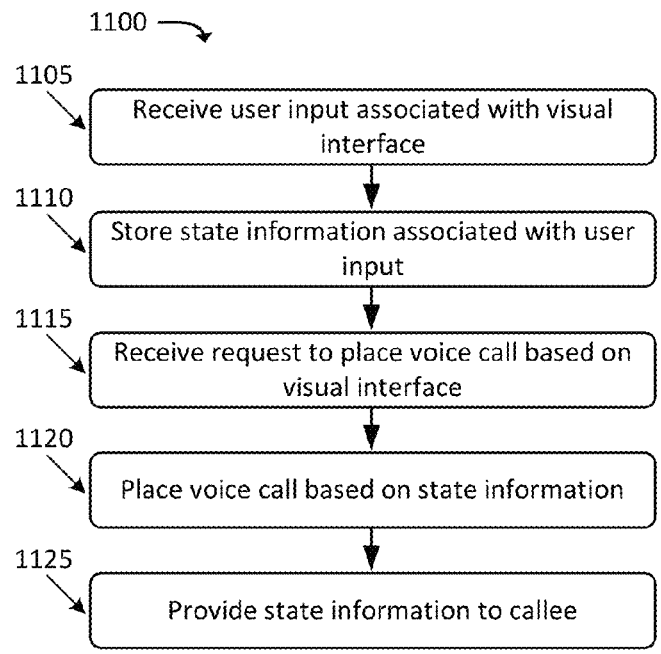
FIG. 11 illustrates an example process for placing a call according to user input provided via a visual interface.

Process 1000 may further include presenting the retrieved visual interface (block 1030). For instance, as described above with respect to I/O module 605 and VI application 610, user device 505 may display the visual interface on a display screen associated with user device 505. In some implementations, when presenting the retrieved visual interface, user device 505 may also output an audio notification (e.g., "Please look at your screen," as shown in the example of FIG. 2). As discussed above, and as further described below with respect to FIG. 11, the visual interface may be used to allow the user to more efficiently perform tasks or obtain information than would be possible with a purely voice-based system.

If the dialed number is not associated with a visual interface (block 1010—NO), then process 1000 may include allowing the call to be placed (block 1035). For example, voice call module 620 may be allowed to place the call corresponding to the dialed number received at block 1005.

FIG. 1100 illustrates an example process 1100 for processing user input in a visual interface (e.g., a visual interface presented at block 1035 of FIG. 10). In some implementations, process 1100 may be performed by user device 505 (e.g., by VI application 610). In other implementations, some or all of process 1100 may be performed by one or more other devices in addition to, or in lieu of, user device 505.

Process 1100 may include receiving user input associated with a visual interface (block 1105). For instance, as described above with respect to I/O module 605 and VI application 610, user device 505 may receive user input via a presented visual interface, such as selections of options presented in the visual interface.

Process 1100 may also include storing state information associated with the user input (block 1110). For example, as discussed above, user device 505 may store an event log (e.g., example event log 900) based on input received via the visual interface.

Process 1100 may additionally include receiving a request to place a voice call based on the visual interface (block 1115). For example, a user may select an option, in the visual interface, that indicates that a call should be placed. For instance, a user may select a "Speak to an agent" option, or a similar option.

Process 1100 may further include placing a voice call based on the state information (block 1120). For example, as described above with respect to VI application 610 and voice call module 620, user device 505 may place a call to IVR server 520 and/or a particular call center 525 based on event log 900. For instance, user device 505 may identify a telephone number associated with the user input provided via the visual interface. In order to identify the telephone number, user device 505 may provide event log information to IVR server 520, which may determine a telephone number associated with the events indicated in event log 900. Additionally, or alternatively, user device 505 may place a voice call to a telephone number, and may automatically provide IVR selections to an IVR menu that is audibly presented when the telephone number is dialed.

In some implementations, user device 505 may provide call log 900 to IVR server 520 (e.g., via SMS, MMS, Transmission Control Protocol/IP ("TCP/IP"), or the like). User device 505 may also place (at 1120) a voice call to IVR server 520, which may call a particular call center 525 based on the provided call log 900. For instance, as described above with respect to FIG. 8, IVR server 520 may determine a telephone number associated with an IVR menu state associated with call log 900, and/or may determine a set of IVR menu options. IVR server 520 may bridge the call with user device 505, so that user device 505 may carry on the call with the callee called by IVR server 520.

Process 1100 may also include providing the state information to a callee of the voice call (block 1125). For example, in some implementations, user device 505 may provide some or all of event log 900 to call center 525 (e.g., via SMS, MMS, TCP/IP, and/or another technique). An operator associated with call center 525 may view the call log and may be able to use the call log to better serve the user of user device 505. For instance, the operator may view selections made by the user in the visual interface, and may be able to provide information to the user based on these selections.

Figure 12:
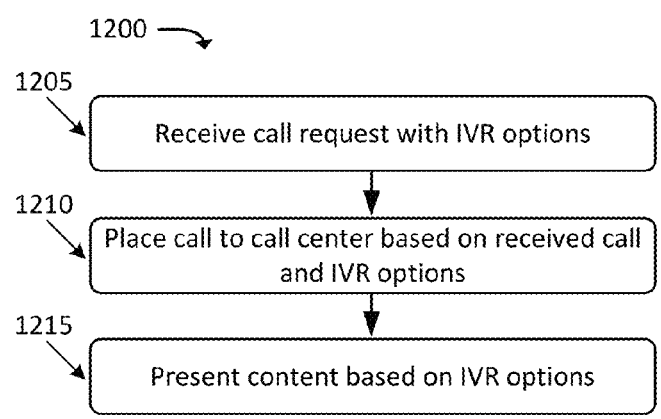
FIG. 12 illustrates an example process for automatically navigating an IVR menu, based on user input provided via a visual interface.

FIG. 12 illustrates an example process 1200 for automatically navigating an IVR menu, based on user input provided via a visual interface. In some implementations, process 1100 may be performed by IVR server 520. In other implementations, some or all of process 1100 may be performed by one or more other devices in addition to, or in lieu of, IVR server 520.

Process 1200 may include receiving a call request with IVR options (block 1205). For example, IVR server 520 may receive a request, from user device 505, to place a call based on a set of IVR options. For instance, as discussed above, the request may include event log 900, based on which IVR server 520 may identify a set of IVR options associated with the requested call. Additionally, or alternatively, the call request may itself indicate a set of IVR options. In some implementations, the call request may be received via SMS, MMS, TCP/IP, and/or another technique. In some implementations, the call request may be received via a voice call placed to IVR server 520.

Process 1200 may also include placing a call to a call center based on the received call and the IVR options (block 1210). For example, IVR server 520 may place a voice call to a particular call center 525 based on the IVR options identified in the call request, and/or based on IVR options determined based on the call request. As described above, placing the voice call may include navigating one or more IVR menus based on the identified IVR menu options, associated with event log 900.

In some implementations, IVR server 520 may bridge the call with user device 505, from which the call request was received (at block 1205). In some implementations, IVR server 520 may forgo bridging the call if IVR server 520 is placed "on hold" when the call is placed. In some such implementations, IVR server 520 may bridge the call with user device 505 when IVR server 520 determines that the call is no longer "on hold." For instance, IVR server 520 may detect a voice on the call (e.g., a voice of an operator associated with call center 525), and/or may otherwise receive an indication (e.g., from call center 525) that the call is no longer "on hold."

Process 1200 may additionally include presenting content based on the IVR options (block 1215). For example, IVR server 520 may present content associated with selections made by the user in a visual interface, as indicated by event log 900. The content may include, for example, audio content (e.g., music associated with the user's selections), store content (e.g., a visual representation of merchandise and/or services for sale), and/or other information (e.g., frequently asked questions, or the like). This content may be presented by user device 505 while the call is "on hold." In some implementations, user device 505 may receive user interaction information associated with the content (e.g., a user may select a particular item for sale, as presented in the content). User device 505 may notify IVR server 520 regarding the user interaction, and IVR server 520 may modify event log 900, to include information regarding the user interaction. IVR server 520 may, in some implementations, provide the information, regarding the user interaction, to a callee of the call (placed at 1210), in order to allow the callee to discuss the user interaction with the user.

FIGS. 13-17 illustrate example series of user interfaces that may be presented to a user, in accordance with some implementations. In some implementations, the user interfaces shown in these figures may be presented via user device 505. In other implementations, some or all of the user interfaces may be shown by one or more other devices in addition to, or in lieu of, user device 505.

Figure 13:
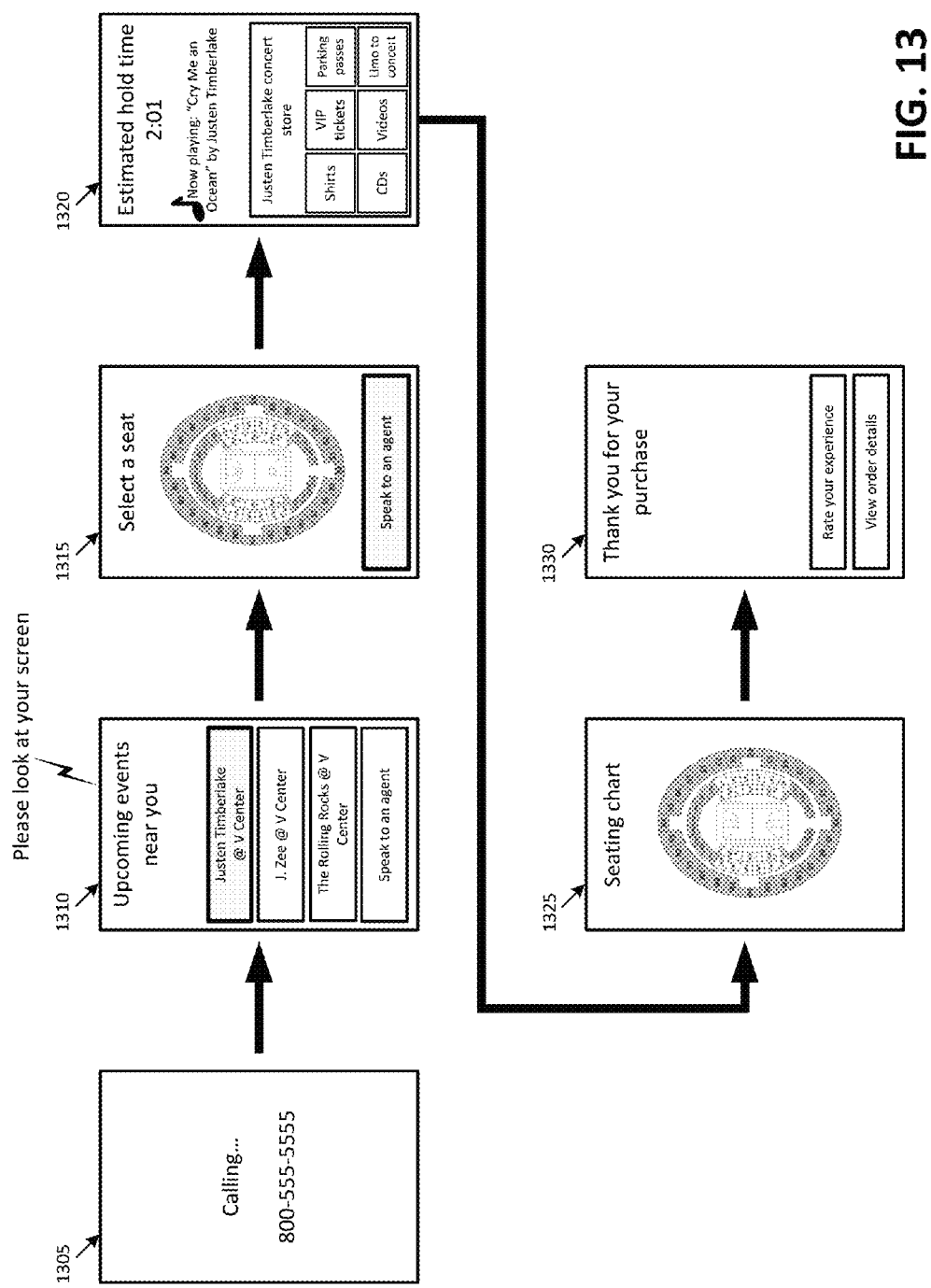
FIGS. 13-17 illustrate example user interfaces that may be presented to a user, in accordance with one or more implementations.

For example, as shown in FIG. 13, user interface 1305 may be presented when a user dials a number associated with a particular call center 505. For example, as shown in the example, assume the user has dialed "800-555-5555." Further assume that this number is associated with a particular call center 505, for which a visual interface is available.

User interface 1310 may correspond to a visual interface that is associated with the dialed number. As shown, when user device 505 presents user interface 1310, user device 505 may audibly play a notification ("Please look at your screen"). As shown in example user interface 1310, the visual interface may correspond to, for example, a service that sells tickets for events. As indicated by the highlighting and the shading, assume that the user selects the option for "Justen Timberlake @ V Center."

Based on the selection, user interface 1315 may be presented. As shown, user interface 1315 may include a seating chart, based on which the user may select a seat or seats. As also shown, an option may be presented to speak to an agent. As indicated by the highlighting and the shading, assume that the user selects the "Speak to an agent" option.

Based on the selection of the "Speak to an agent" option, user interface 1320 may be displayed. User interface 1320 may correspond to "on hold" content provided by, for example, IVR server 520. As shown, the "on hold" content may be based on the user's selections in the previous screens. For example, a song by Justen Timberlake may play while the user is on hold, and options to select merchandise and/or services associated with the selected concert (e.g., shirts, VIP tickets, parking passes, CDs, videos, and limo to concert) may be presented. As also shown, an estimated hold time may also be displayed.

User interface 1325 may be presented once the call is no longer on hold. For example, an agent associated with call center 525 may "push" (e.g., via SMS, MMS, TCP/IP, and/or another technique) an instruction to user device 505 to display user interface 1325, which may include a seating chart. The user may use the seating chart while speaking to the agent, in order to select a seat.

User interface 1330 may be presented when the user has purchased a seat. For example, the agent associated with call center 525 may "push" an instruction to user device 505 to display user interface 1330. As shown, user interface 1330 may include an option to rate the user's experience, and an option to view order details.

Figure 14:
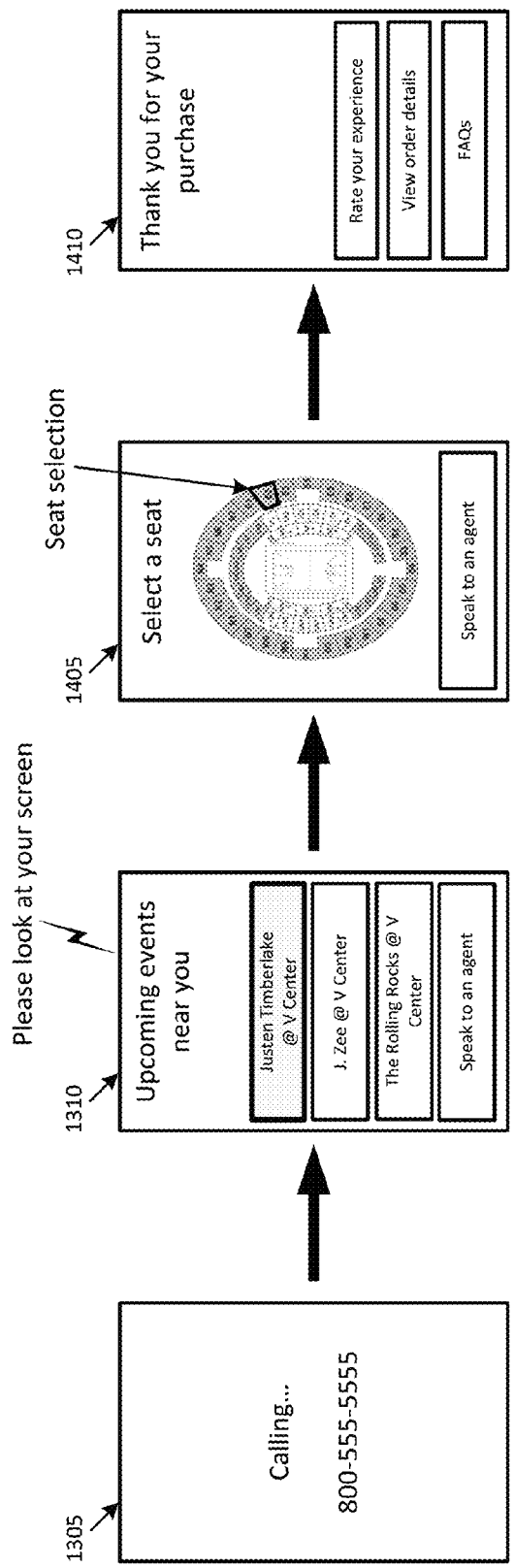

FIG. 14 illustrates a series of user interfaces that may correspond to a user making selections in a visual interface, without needing to speak to an agent. Some of the example user interfaces (i.e., user interfaces 1305 and 1310) are the same as discussed above with respect to FIG. 13 and will, therefore, not be described in detail here. As shown in FIG. 14, user interface 1405 may correspond to a visual interface that is presented upon the selection (in user interface 1310) of a particular event, for which a user may be interested in purchasing tickets. As shown in user interface 1405, the user may select a seat via the visual interface. While not explicitly shown, the user may complete the transaction via another user interface (e.g., by providing payment information). Upon completion of the transaction, user interface 1410 may be displayed. In some implementations, user interface 1410 may include an option (frequently asked questions, or "FAQs") to view additional information regarding the selected event. Upon selection of the option, additional information, such as parking information, venue information, or the like, may be presented.

Figure 15:
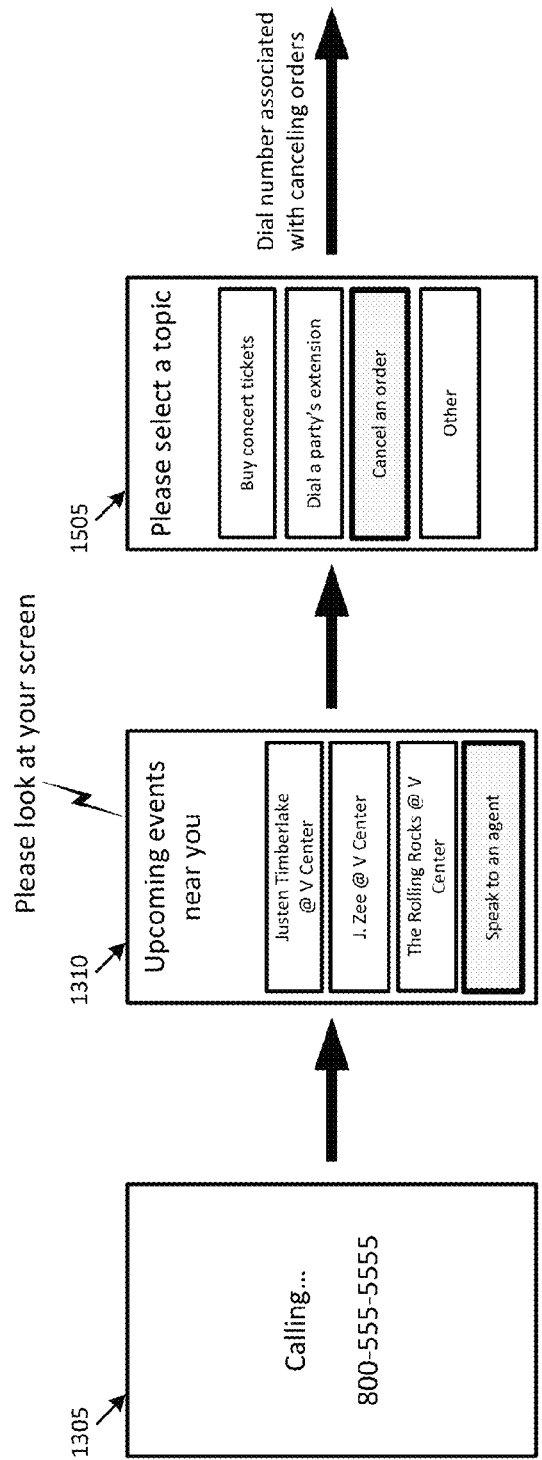

FIG. 15 illustrates a series of user interfaces that may correspond to IVR menu options being presented visually to a user. Some of the example user interfaces (i.e., user interfaces 1305 and 1310) are the same as discussed above with respect to FIG. 13 and will, therefore, not be described in detail here. As shown, a user may select a "Speak to an agent" option in user interface 1310.

Based on the selection of the "Speak to an agent" option, user interface 1505 may be displayed. For example, user device 505 may notify IVR server 520 that a call is requested, and IVR server 520 may respond with visual options that would be audibly presented, via IVR, if the call were placed. User device 505 may display the IVR options visibly via user interface 1505. As further shown, assume that the user selects a particular option, "Cancel an order." Based on the selection of this option, a call may be placed to a telephone number associated with canceling orders. This may allow the user to bypass the need for audibly interacting with an IVR menu, thus saving the user's time.

Figure 16:
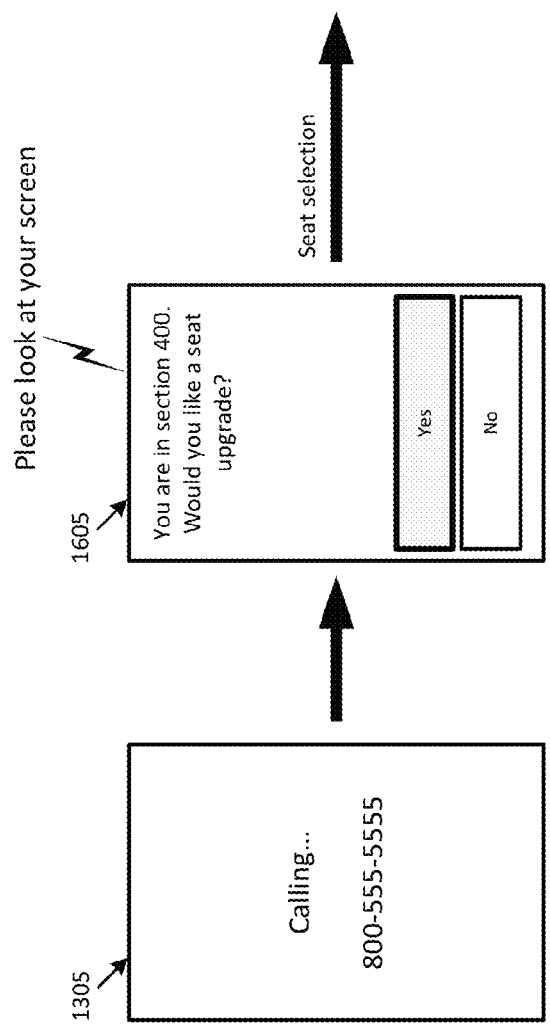

FIG. 16 illustrates a series of user interfaces that may correspond to a visual interface, which is based on a user's location. For instance, as shown, user interface 1605 may be presented when a user dials a number associated with visual interfaces. Assume, for example, that the dialed number is a number associated with a ticket vendor. Further assume that the user is presently located at an event that is in progress, for which the ticket vendor sells tickets. Based on the location information, VI application 610 may determine a seating location (e.g., a section), of a venue at which the event is being held, in which the user is located. Additionally, or alternatively, VI application 610 may determine the seating location of the user based on a user profile or user history (e.g., a ticket purchase history). VI application 610 may also determine that a seat upgrade is available (e.g., unsold tickets that may be more desirable). For example, VI application 610 may communicate with a server associated with the ticket vendor to determine that the seat upgrade is available.

As shown, user interface 1605 may include an option to purchase upgraded seats. In some implementations, the upgraded seats may be sold at a discount, as compared to an initial price of the seats. In some implementations, upon purchase of the upgraded seats, the user's original seats may be made available for purchase.

Figure 17:
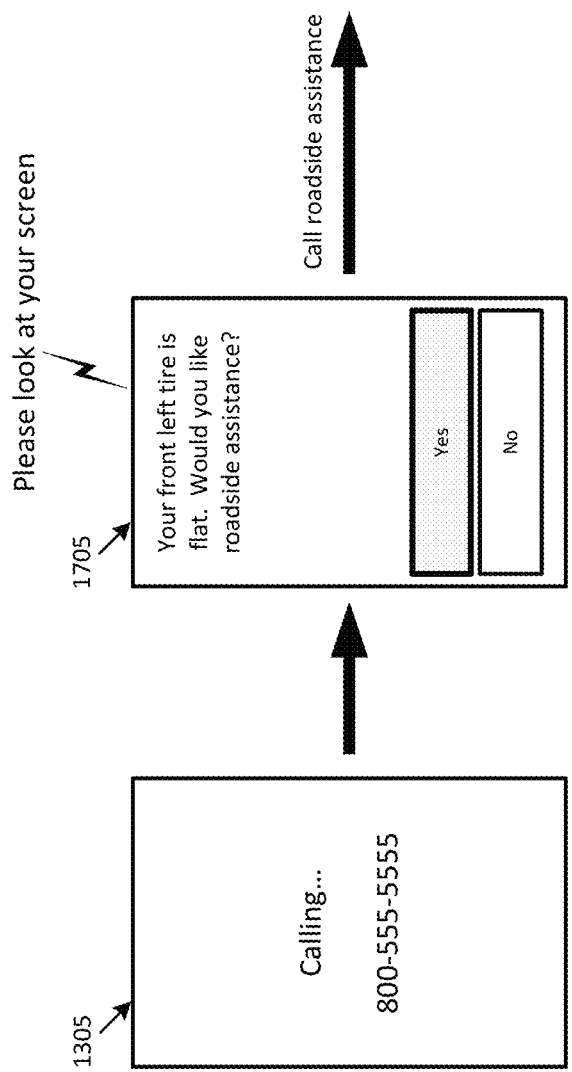

FIG. 17 illustrates a series of user interfaces that may correspond to a visual interface, which may be provided based on automobile diagnostic information. For instance, user device 505 may be in communication with diagnostic device associated with an automobile, such as a device that is attached to an on-board diagnostics ("OBD") port (e.g., an OBD II port) of an automobile. For instance, user device 505 may communicate with the diagnostic device via Bluetooth®, Near Field Communication ("NFC"), Wi-Fi, and/or another communication technique.

In some implementations, upon detection of an automobile-related event (e.g., a potential car accident, a low tire warning, a fuel warning, etc.), user device 505 may automatically place a call to a particular call center 505 associated with assisting with automobile-related events. In some situations, a user may manually call such a particular call center 525. As shown, when dialing a number, VI application 610 may determine that the dialed number is related to a call center 525 that is associated with automobile assistance. VI application 610 may obtain a visual interface (e.g., user interface 1705). When obtaining the visual interface, VI application 610 may provide automobile diagnostic information, and the visual interface may be personalized based on the automobile diagnostic information. For instance, as shown in FIG. 17, user interface 1705 may include a message indicating that a tire is flat, and may present an option to contact roadside assistance. This may be useful in situations where different callees may be associated with different services (e.g., one callee associated with roadside assistance, another callee associated with reporting emergencies, etc.).

Figure 18:
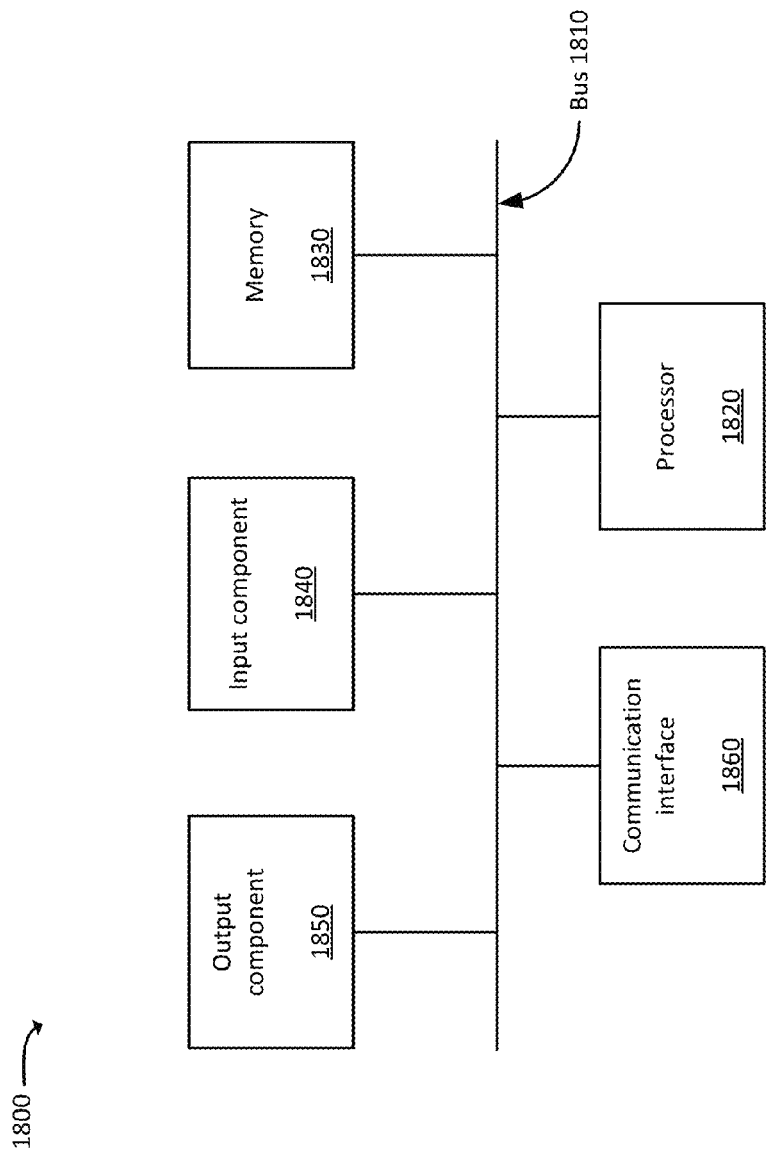
FIG. 18 illustrates example components of one or more devices, according to one or more implementations described herein.

FIG. 18 is a diagram of example components of device 1800. One or more of the devices described above may include one or more devices 1800. Device 1800 may include bus 1810, processor 1820, memory 1830, input component 1840, output component 1850, and communication interface 1860. In another implementation, device 1800 may include additional, fewer, different, or differently arranged components.

Bus 1810 may include one or more communication paths that permit communication among the components of device 1800. Processor 1820 may include a processor, microprocessor, or processing logic that may interpret and execute instructions. Memory 1830 may include any type of dynamic storage device that may store information and instructions for execution by processor 1820, and/or any type of non-volatile storage device that may store information for use by processor 1820.

Input component 1840 may include a mechanism that permits an operator to input information to device 1800, such as a keyboard, a keypad, a button, a switch, etc. Output component 1850 may include a mechanism that outputs information to the operator, such as a display, a speaker, one or more light emitting diodes ("LEDs"), etc.

Communication interface 1860 may include any transceiver-like mechanism that enables device 1800 to communicate with other devices and/or systems. For example, communication interface 1860 may include an Ethernet interface, an optical interface, a coaxial interface, or the like. Communication interface 1860 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 1800 may include more than one communication interface 1860. For instance, device 1800 may include an optical interface and an Ethernet interface.

Device 1800 may perform certain operations relating to one or more processes described above. Device 1800 may perform these operations in response to processor 1820 executing software instructions stored in a computer-readable medium, such as memory 1830. A computer-readable medium may be defined as a non-transitory memory device. A memory device may include space within a single physical memory device or spread across multiple physical memory devices. The software instructions may be read into memory 1830 from another computer-readable medium or from another device. The software instructions stored in memory 1830 may cause processor 1820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 10-12, the order of the blocks may be modified in other implementations. Further, non-dependent blocks may be performed in parallel.

Additionally, while example data structures illustrated in FIGS. 7 and 8 as including certain types of information, in practice, these data structures may store additional, fewer, different, or differently arranged types of information than shown in these figures. Furthermore, while these data structures are shown as tables, in practice, these data structures may take the form of any other type of data structure, such as an array, a linked list, a hash table, a tree, and/or any other type of data structure.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, comprising:
   receiving, by a user device, a request to place a voice call, wherein the request to place the voice call includes a set of dialed digits;
      determining, by the user device, that a callee, associated with the voice call, is associated with a visual interface, wherein determining that the call is associated with the visual interface includes:
         providing, to a server, the set of dialed digits, and
         receiving, from the server and in response to providing the set of dialed digits, an indication that the set of dialed digits is associated with the visual interface;
   forgoing, by the user device, placing the requested voice call based on determining that the callee is associated with the visual interface;
   obtaining, by the user device, the visual interface, wherein obtaining the visual interface further comprises:
   outputting user information regarding at least one of:
      the user device, or
      a user associated with the user device,
   wherein the visual interface is personalized based on the user information,
   wherein the visual interface includes information regarding goods or services that are selected based on the user information; and
   presenting, by the user device, the visual interface.

2. The method of claim 1, wherein determining that the call is associated with the visual interface further includes:
   determining that the set of dialed digits is associated with the visual interface.

3. The method of claim 1, wherein the visual interface includes a set of graphical options, wherein the set of graphical options are based on an interactive voice response ("IVR") menu associated with the callee.

4. The method of claim 1, wherein the user information includes information regarding at least one of:
   a geographical location of the user device,
   user preference information, or
   user history information.

5. The method of claim 1, wherein presenting the visual interface includes:
   outputting an audible notification regarding the visual interface, the audible notification indicating that the visual interface is being presented and is available for use by a user of the user device.

6. The method of claim 1, wherein the user information includes:
   information regarding a geographical location of the user device, and
   information indicating that the user has purchased tickets to a particular event,
   the method further comprising:
      determining that the particular event is in progress at a time that the request, to place the voice call, is received; and
      determining, based on the geographical location of the user device, that the user device is within a particular proximity of the particular event at the time that the request, to place the voice call, is received,
      wherein the information regarding goods or services, included in the visual interface, includes information regarding the particular event in progress.

7. The method of claim 6, wherein the user information further includes:
   ticket information, for the particular event, associated with the user;
   wherein the information regarding goods or services, included in the visual interface, includes ticket upgrade information, the ticket upgrade information relating to upgrading one or more seats associated with the ticket information.

8. The method of claim 1, wherein the user information includes:
   automobile diagnostic information collected from an automobile diagnostic device that is communicatively coupled to the user device,
   wherein the information regarding goods or services, included in the visual interface, includes a selectable option to contact a roadside assistance service, the selectable option being presented based on the automobile diagnostic information.

9. The method of claim 1, wherein the user information includes:
   information regarding a geographical location of the user device,
   wherein the information regarding goods or services, included in the visual interface, includes a selectable option to purchase tickets to events that have been selected based on the geographical location of the user device.

10. A user device, comprising:
    a memory device storing a set of processor-executable instructions; and
    a processor configured to execute the processor-executable instructions, wherein executing the processor-executable instructions causes the processor to:
    receive a request to place a voice call, wherein the request to place the voice call includes a set of dialed digits;
    provide, to a server, the set of dialed digits;

receive, from the server and in response to providing the set of dialed digits, an indication that the set of dialed digits is associated with a visual interface;

forgo, based on the indication that the set of dialed digits is associated with the visual interface, placing the requested voice call;

output, to a server device, user information regarding at least one of:

the user device, or a user associated with the user device; and receive the visual interface, associated with an intended callee of the requested voice call, from the server device, wherein the received visual interface is personalized based on the user information;

wherein the personalized visual interface includes information regarding goods or services that are selected based on the user information; and present the customized visual interface, in lieu of placing the requested voice call.

11. The user device of claim 10, wherein executing the processor-executable instructions further causes the processor to:

determine, based on the set of dialed digits, that the intended callee is associated with the visual interface.

12. The user device of claim 10, wherein the visual interface includes a set of graphical options, wherein the set of graphical options are based on an interactive voice response ("IVR") menu associated with the callee.

13. The user device of claim 10, wherein the user information includes information regarding at least one of:

a geographical location of the user device, user preference information, or user history information.

14. The user device of claim 10, wherein executing the processor-executable instructions, to present the visual interface, causes the processor to:

output an audible notification, indicating that the visual interface has been presented in lieu of the voice call being placed to the callee.

15. The user device of claim 10, wherein the user information includes:

information regarding a geographical location of the user device, and information indicating that the user has purchased tickets to a particular event, wherein executing the computer-executable instructions further causes the processor to:

determine that the particular event is in progress at a time that the request, to place the voice call, is received; and determine, based on the geographical location of the user device, that the user device is within a particular proximity of the particular event at the time that the request, to place the voice call, is received, wherein the information regarding goods or services, included in the visual interface, includes information regarding the particular event in progress.

16. The user device of claim 15, wherein the user information further includes:

ticket information, for the particular event, associated with the user;

wherein the information regarding goods or services, included in the visual interface, includes ticket upgrade information, the ticket upgrade information relating to upgrading one or more seats associated with the ticket information.

17. The user device of claim 10, wherein the user information includes:

automobile diagnostic information collected from an automobile diagnostic device that is communicatively coupled to the user device, wherein the information regarding goods or services, included in the visual interface, includes a selectable option to contact a roadside assistance service, the selectable option being presented based on the automobile diagnostic information.

18. The user device of claim 10, wherein the user information includes:

information regarding a geographical location of the user device, wherein the information regarding goods or services, included in the visual interface, includes a selectable option to purchase tickets to events that have been selected based on the geographical location of the user device.

19. A method, comprising:

presenting, by a user device, a visual interface, the visual interface being associated with a first requested voice call, wherein the visual interface was presented in lieu of placing the first requested voice call, wherein the first requested voice call is a requested voice call to a general customer service department associated with a company, wherein the visual interface is personalized based on information regarding at least one of:

the user device, or a user associated with the user device;

receiving, by the user device, information regarding user input provided via the visual interface, wherein receiving the user input includes:

receiving, via the visual interface, a second request to place a voice call, wherein the second requested voice call is a requested voice call to a particular sub-department within the customer service department associated with the company; and placing, by the user device, a voice call based on the second request, wherein a first telephone number, associated with the first request, is different from a second telephone number, associated with the second request.

20. The method of claim 19, wherein the visual interface includes one or more selectable options other than options to specify a telephone number, wherein the user input includes a selection of at least one of the one or more selectable options, wherein the second telephone number is selected based on the selection of the at least one of the one or more selectable options.

* * * * *